United States Patent [19]

Shimakawa et al.

[11] Patent Number: 5,802,260
[45] Date of Patent: Sep. 1, 1998

[54] PRINTING SYSTEM

[75] Inventors: Takuya Shimakawa, Yokohama; Seiji Kageyama, Kawasaki; Satoru Matsumoto, Yokohama; Makoto Kitagawa, Fujisawa; Takahiro Shiotani, Kanagawa-ken; Naomi Tamura, Ebina, all of Japan

[73] Assignee: Hitachi, Ltd., Tokyo, Japan

[21] Appl. No.: 562,181

[22] Filed: Nov. 22, 1995

[30] Foreign Application Priority Data

Nov. 28, 1994 [JP] Japan .................................. 6-293012

[51] Int. Cl.$^6$ .................................................. G06K 15/00
[52] U.S. Cl. ............................................ 395/114; 395/113
[58] Field of Search .................................. 395/114, 112, 395/113, 101, 800, 115, 116, 117, 500, 180, 181, 182.02, 182.03, 184.01, 182.13; 358/402, 407, 408, 467, 468, 406, 404, 444, 405, 437

[56] References Cited

U.S. PATENT DOCUMENTS

| | | | |
|---|---|---|---|
| 4,651,278 | 3/1987 | Herzog et al. | 395/117 |
| 5,220,674 | 6/1993 | Morgan et al. | 395/800 |
| 5,303,336 | 4/1994 | Kageyama et al. | 395/114 |
| 5,371,837 | 12/1994 | Kimber et al. | 395/114 |
| 5,450,571 | 9/1995 | Rosekrans et al. | 395/112 |
| 5,467,434 | 11/1995 | Hower, Jr. et al. | 395/114 |

*Primary Examiner*—Edward L. Coles, Sr.
*Assistant Examiner*—Dov Popovici
*Attorney, Agent, or Firm*—Antonelli, Terry, Stout, & Kraus, LLP

[57] ABSTRACT

A printing system having a plurality of printers and computers connected to each other through a communication network is disclosed. A first computer is connected with a second computer through the network. A first computer generates a printing job and a print request signal for executing the printing job according to a print request designated by the user to a first printer. A first computer also generates a continued print request signal containing information unique to the user according to a continued print request from the user requesting the execution of the printing job to a second printer. The printing job and each signal are transmitted to the communication network from the communication unit of the first computer. A second computer receives the printing job and each signal through the communication network. The second computer further causes the first printer to execute the printing job designated by the user in accordance with the print request signal. Upon receipt of a signal containing a continued print request and information unique to the user, the second computer decides that the information unique to a user belongs to the user designating the printing job. In the case where it is decided that the signal containing a continued print request and information unique to a user belongs to the user, the second computer causes the second printer to execute the printing job according to a continued print request.

3 Claims, 9 Drawing Sheets

| 701 ~ PASSWORDS | PRINTING JOB NAMES ~ 702 |
|---|---|
| xy12rt | REPORT. txt |
| cbne6 # | SPECIFICATION. txt |
| | |

PRINTING SYSTEM

CROSS-REFERENCES TO RELATED APPLICATIONS

The present application relates to subject matter described in copending patent applications Ser. No. 08/266,699 filed on Jun. 28, 1994, now abandoned, and assigned to the assignee of the present application, and Ser. No. 08/361,226 filed on Dec. 21, 1994, now U.S. Pat. No. 5,625,757, and assigned to the assignee of the present application, the contents of which are incorporated herein by reference.

BACKGROUND OF THE INVENTION

The present invention relates to a printing system in which computers including work stations or personal computers connected to a network such as a LAN can share a plurality of printers.

In a printing system comprising a plurality of printers and computers connected to a communication network, upon the user's request for a desired printing job, the computer on the user side creates the printing job. The printing job is temporarily stored in a spool (a simultaneous peripheral operation on line) of a computer such as a print server for controlling the printing system. The print server causes the printing operation to be performed by a printer designated in accordance with the printing job read from the spool. In this type of printing system, assuming that the execution of the printing job of a printer X first requested for printing by a user A through his computer terminal is interrupted for some reason, it is necessary to continue the printing job on the same printer or another printer. The interruption of a printing job may occur for reasons of the user's work, or due to a malfunction (error) of the printer.

In the case of an interruption due to the user's work, the user A is expected to request the resumption of the printing job on the same printer X or another printer within an appropriate time. On the other hand, when the interruption is due to a malfunction of the printer, the printing job is resumed on an alternate printer. In the conventional printing system, a user B other than the user A can resume a printing job on an alternate printer Y by requesting that printing be resumed on the printer Y freely from the same or another terminal without regard to the intention of the user A. In such a case, the user A who is not informed that the printing job has been transferred from the spool of printer X to that of printer Y is confused because he is not aware of the position of the printing job in spite of his intention to continue the printing operation on the same printer X or on another printer Z. This confusion is caused by the fact that the printer or the computer cannot identify a user who has requested an original printing job.

SUMMARY OF THE INVENTION

An object of the invention is to solve the above-mentioned problems and provide a printing system in which only the user requesting a printing job and the system manager can continue a printing operation without any confusion on an alternate printer intended by the user or the system manager.

Another object of the invention is to provide a printing system with an improved overall reliability.

In a printing system according to this invention, a user requesting a printing operation is compared with a user who has issued a request for a continued printing operation. An information signal unique to a user such as an ID signal is generated for specifying the user designating a printing job based on a printing request. In the case where a request is issued for a continued printing operation, the computer for controlling the execution of a printing job causes the printing job to be executed by a designated alternate printer only when the information unique to the user is the same as that associated with the user first issuing the printing request.

According to one aspect of the invention, there is provided a printing system with a plurality of printers connected to a plurality of computers through a communication network, including:

a first computer including a unit for generating a printing job based on a printing request designated by a user and a printing request signal for executing the printing job on a first printer, a unit for generating a continued printing request signal including information unique to the user requesting the execution of the printing job based on a continued printing request from the user on a second printer, and a communication unit for sending the printing job and each of the signals to the communication network; and a second computer including a unit for receiving the printing job and each of the signals through the communication network, a unit for causing the first printer to execute the printing job designated by the user in accordance with the printing request signal, a unit for deciding that information unique to the user belongs to the user designating the printing job upon receipt of a signal containing a request for a continued printing operation and the information unique to the user, and a unit for causing the second printer to execute the printing job based on the request for a continued printing operation upon a decision that the signal containing the request for a continued printing operation and the information unique to the user is associated with the user designating the printing job.

According to another aspect of the present invention, there is provided a printing system in which the computer verifies a user requesting a continued printing operation so that the user capable of continuing a printing job can be restricted, with the result that users other than the system manager or the particular user who requested the printing job are prevented from continuing the printing job on another printer. Thus, the reliability of the printing system as a whole can be improved without any confusion.

According to still another aspect of the invention, there is provided a printing system which can be applied not only to a print server directly connected to a printer but also to a network printer directly connected to the network. The network printer is controlled by a print server connected to the network.

BRIEF DESCRIPTION OF THE DRAWINGS

FIG. 9 is a diagram showing the configuration of a password table shown in FIG. 8.

DESCRIPTION OF THE PREFERRED EMBODIMENTS

Embodiments of the invention will be described with reference to the accompanying drawings.

First, a first embodiment of the invention will be described with reference to FIGS. 1 to 5.

Figure 1:
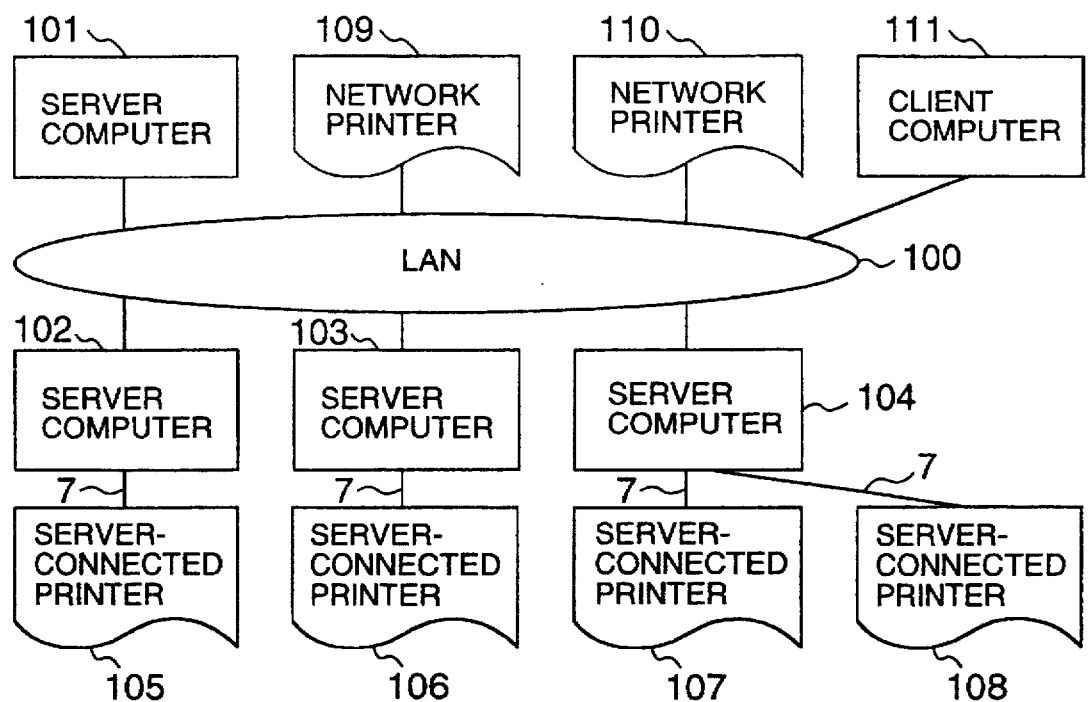
FIG. 1 is a diagram showing the configuration of a network of a printing system according to the invention.

FIG. 1 is a diagram showing the general configuration of a printing system according to the first embodiment. Numeral 100 designates a LAN (Local Area Network) to which is connected a computer 101, printers 105, 106, 107, 108 connected directly to computers 102, 103, 104, network printers 109, 110, and a computer 111. The printers are of two types: the server-connected printers 105, 106, 107, 108 directly connected to the computers (servers) 102, 103, 104, and the network printers 109, 110 directly connected to the LAN 100. The network printers 109, 110 are controlled by the computer (server) 101, have a function and performance equal to those of the server-connected printers 105, 106, 107, 108, and can be controlled in the same manner as the server-connected printers 105, 106, 107, 108.

The server-connected printers 105, 106, 107, 108 and the network printers 109, 110 are hereinafter referred to simply as printers. Also, the computers 101, 102, 103, 104 having a function of controlling the server-connected printers or the network printers are called print servers, and the computer 111 having a function of printing control including a print request to be issued to the printers controlled by the print servers is called a client. The computer 101, 102, 103 or 104 may also be a client.

Figure 2:
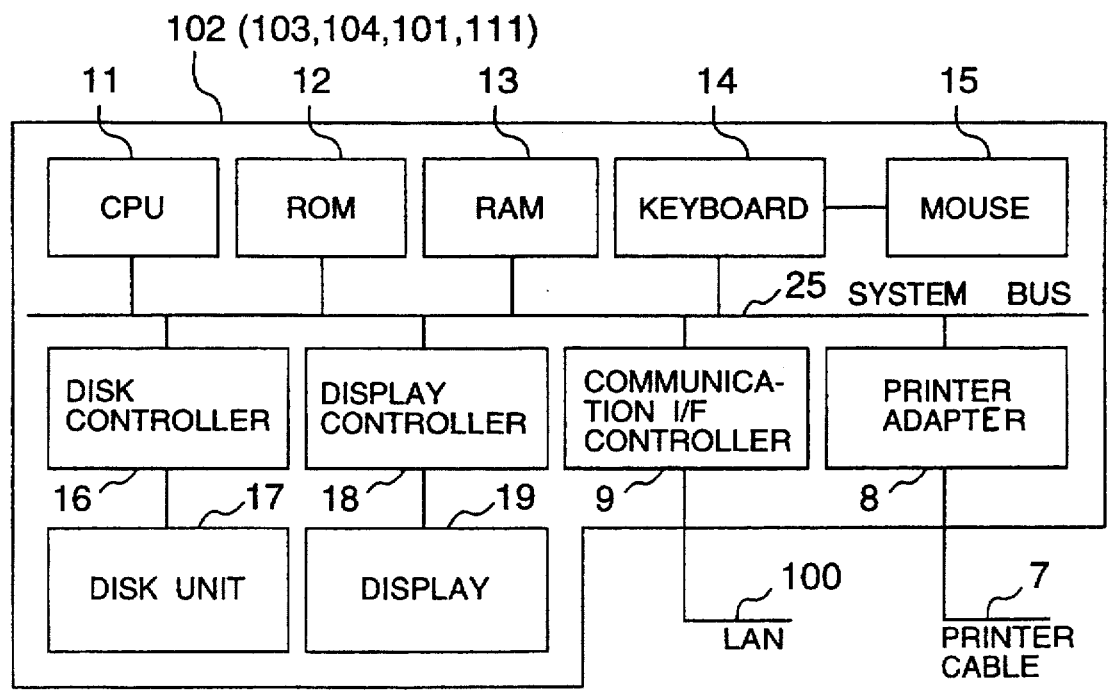
FIG. 2 is a diagram showing a specific hardware configuration of a client/print server according to the invention.

FIG. 2 is a diagram showing the hardware configuration of the computers 101 to 104, 111, i.e., the client and print servers shown in FIG. 1. Although the server 102 is shown in FIG. 2, the client 111 and the print servers 101, 103, 104 have the same configuration. The print server 102 includes input devices such as a keyboard 14 and a mouse 15, a CPU 11, a ROM 12, and a RAM 13 connected to a system bus 25, a disk unit (external memory) 17 controlled by a disk controller 16, a display 19 controlled by a display controller 18, a printer adapter 8 to which is connected printer cable 7, and a communication I/F controller 9 connected to the LAN 100. The print server 102 has a user interface for exchanging information with the user. The user interface includes a command input CUI (character-based user interface) based on characters and a GUI (graphical user interface) centered on message output.

Figure 3:
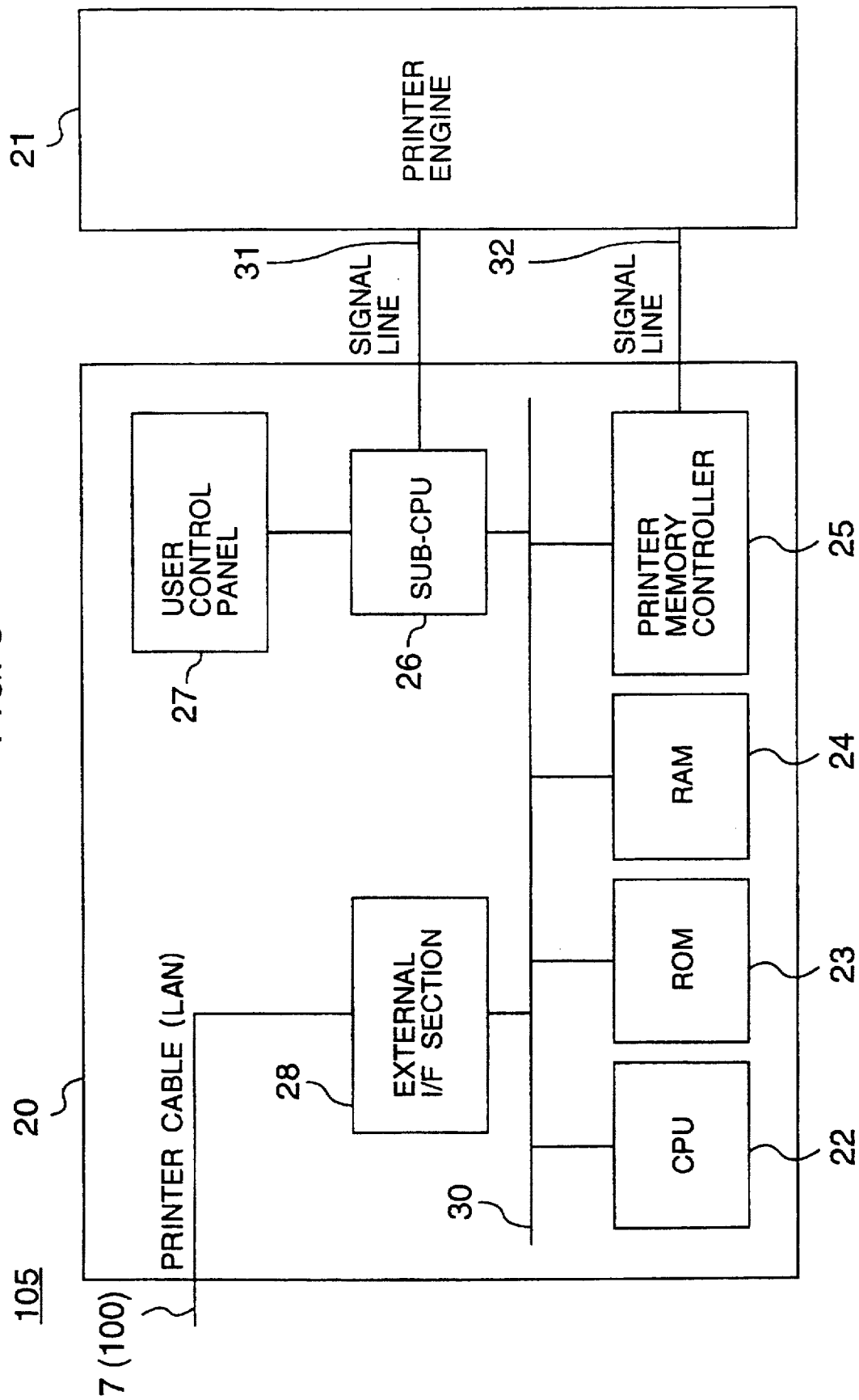
FIG. 3 is a diagram showing a specific hardware configuration of a printer according to the invention.

FIG. 3 is a diagram showing the hardware configuration of printers 105 to 110. Apart from the printer 105 shown in FIG. 3, the other printers 106 to 110 have the same configuration. The printer 105 includes a printer controller 20 connected to the printer cable 7 (but note that the printers 109, 110 are connected to the LAN 100 instead) of the print server 102, and a printer engine 21 controlled on the basis of signal lines 31 and 32 output from the printer controller 20. The printer controller 20 includes a CPU 22, a ROM 23, and a RAM 24 connected to a CPU bus 30, a printer memory controller 25 which outputs a signal line 32, a sub-CPU 26 which outputs a signal line 31 processed based on a signal from a user control panel 27, and an external I/F section 28 connected to the printer cable 7 or the LAN 100.

Figure 4:
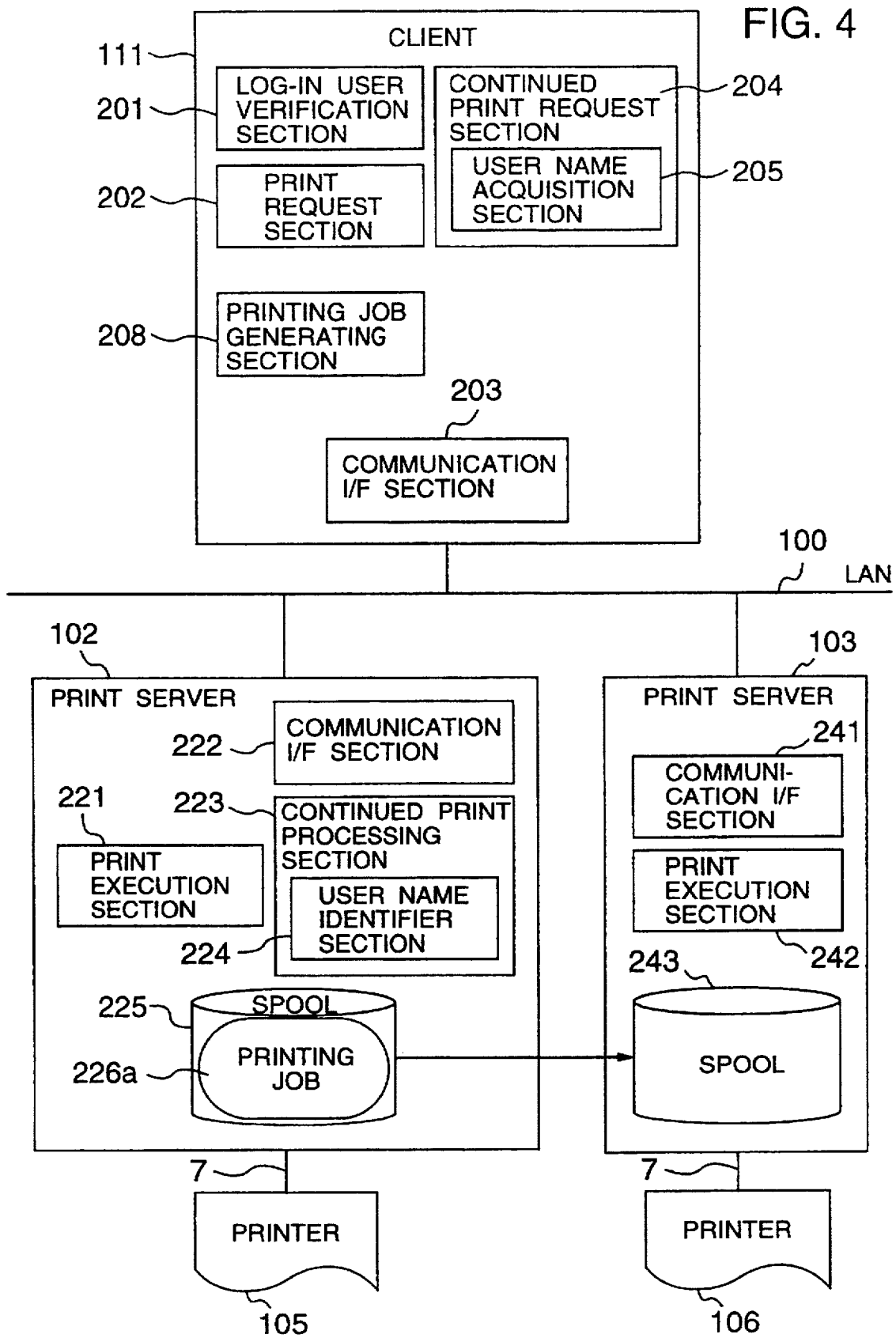
FIG. 4 is a diagram showing the functional configuration of a printing system according to a first embodiment of the invention.

FIG. 4 is a diagram showing the functional configuration in which the client (computer, terminal) 111, the print server 102, and the print server 103 are connected to the LAN 100.

Specifically, the client 111 includes a log-in user verification section 201, a print request section 202, a communication I/F section (corresponding to the communication I/F controller 9 in FIG. 2) 203, a continued print request section 204, and a printing job generating section 208. The continued print request section 204 has a user name acquisition section 205.

The print server 102 includes a print execution section 221, a communication I/F section (corresponding to the communication I/F controller 9 in FIG. 2) 222, a continued print processing section 223, and a spool 225 (corresponding to the disk unit (external memory) 17 in FIG. 2) 225. The continued print processing section 223 has a user name identifier section 224. The spool 225 has a printing job 226a stored therein. The printer 105 (configured as shown in FIG. 3) is connected to the print server 102 by the printer cable 7.

The print server 103 includes a print execution section 242, a communication I/F section 241, and a spool 243 (corresponding to the disk unit (external memory) 17 in FIG. 2). The printer 106 (constituted as shown in FIG. 3) is connected to the print server 103 by the printer cable 7.

The printing system can be controlled in the same way also when the printer 105 or the printer 106 is a network printer. When using network printers, a single print server can be used for the purpose of control, in which case the spool in the single print server is constructed to store the printing jobs for each network printer.

As shown in FIG. 4, the printing job generating section 208 installed in the client 111 is for generating a file of user names as printing jobs (text and image information) intended by the CPU 11 according to the program stored in the ROM 12 on the basis of information input by the user through an input unit and storing the file in the disk unit (external memory) 17. Obviously, the printing jobs may be generated in the printing job generating section 208 by being input through an image input means such as an image scanner, a facsimile machine, or an electronic mail system connected thereto, or from data read out of a memory unit such as a floppy disk. The printing jobs thus generated are registered with the user names described in a file.

The log-in user verification section 201 in the client 111 includes the input devices such as the keyboard 14 and the mouse 15, the CPU 11, the ROM 12, the RAM 13, the disk unit (external memory) 17 and the display (display means) 19. When the user logs in to the client 111, the correct user name (which may be an abbreviation) and a password are input by use of the input devices 14 and 15. The CPU 11 executes the log-in script according to a log-in program stored in the ROM 12. The log-in user verification section 201 causes the CPU 11 to store the input correct user name and password in the RAM 13 or the disk unit (external memory) 17 and thereby manages the right (environment) of the users to log in to the client 111.

The print request section 202 of the client 111 shown in FIG. 4 includes the input devices such as the keyboard 14 and the mouse 15, the CPU 11, the RAM 13, the disk unit (external memory) 17 and the display (display means) 19. When the user requests a printing operation on the printer 105 for a desired printing job by inputting a print request command through an input device, the CPU 11 selects a file 226a of the requested printing job from the printing jobs generated by the printing job generating section 208 on the basis of a program stored in the ROM 12. The printing job includes a control file and a data file, for example. The control file is for describing general information of printing jobs, and contains the description of the names of the requesting user, the computer, and the data file. The data file is for indicating printing contents described in a page description language. The CPU 11 then stores the selected file 226a in the spool 225 (corresponding to the disk unit (external memory) 17 in FIG. 2) of the print server 102 through the LAN 100 via the communication I/F section 203. The printing job file 226a stored in the spool 225 contains the description of the names of the user requesting the printing operation and the computer (the name specifying the client 111).

The communication I/F sections 203, 222, 241 are for performing communication between the client 111 and the print servers 102, 103 or between the print servers 102, 103 themselves, and include a control section for a network such as Ethernet or FDDI (Fiber Distributed Data Control) and a control section for a communication protocol such as TCP/IP (Transmission Control Protocol/Internet Protocol) or SPC/IPX (Sequenced Packet Exchange/Internetwork Packet Exchange).

The continued print request section 204 of the client 111 shown in FIG. 4 includes a user name acquisition section 205. When the user inputs a continued print command (which is comprised of the names of the printing job, the printer first requested for printing, and an alternate printer) through an input device, the CPU 11 causes the continued print request section 204 to acquire the name of the user who has input the continued print command by referring to (checking) the user name stored in the RAM 13 or the disk unit (external memory) 17 of the log-in user verification section 201 on the basis of the input continued print command according to a program stored in the ROM 12. The continued print request section 204 causes the CPU 11 to create a communication message (comprised of the names of the printing job, the printer first requested for printing, the alternate printer, and the user) containing the continued print command input from the input device by the user and the user name acquired by the user name acquisition section 205 and added to the continued print command according to the program stored in the ROM 12, which communication message is transmitted from the communication I/F section 203 through the LAN 100 to the print server 102. The contents of the communication message created in the continued print request section 204 include the names of the printing job, the printer first requested for printing, the alternate printer, and the user (the name of which is acquired in the user name acquisition section 205).

In the case where the user requests continued printing, the specification of the continued print command input to the client 111 by the input device includes the name of the printing job (which was already input at the time of the original print request and is not necessarily required at the time of the continued print request), the name of the printer first requested for printing, and the name of the alternate printer.

The continued print command is issued in the case where the printing job is interrupted due to a malfunction of the printer 105 during operation or where the printing job stored in the spool 225 is not yet executed completely. More specifically, assume that the user requests a printing job to be printed on the printer 105 and that the particular printing job is stored in the spool 225 of the print server 102 to which the printer 105 is connected. In the case where a plurality of printing jobs requested by a plurality of other users are stored in the spool 225 so that the printing job for the particular user is in a waiting queue with a considerable time expected before start of execution, however, the request for the printing job may be transferred to another printer 106 having a vacant spool 243. In such a case, too, the continued print command is issued. The spools 225 and 243 are memory units such as a magnetic disk unit and have a sufficient capacity to store a plurality of different printing jobs. The spool has such a queue structure so as to execute a plurality of stored printing jobs according to printing requests on a first-come first-served basis.

The continued print command is input after the user confirms that the printing job is stored in the spool 225. In order to help the user easily confirm that the printing job is stored in the spool 225 of the print server 102, the environmental conditions of the printers 105, 106 and the job storage conditions in the spools 225 and 243 are communicated from the print servers 102 and 103 to the client 111 through the LAN 100, and are managed by the client 111. The environmental conditions of the printers 105 and 106 and the job storage conditions in the spools 225 and 243 are desirably displayed on the display 19, for example. Also, if the environmental conditions of the printers 105 and 106 and the job storage conditions in the spools 225 and 243 are managed by the client 111, it is not necessary that the continued print command is input after the user confirms the environmental conditions of the printers 105 and 106 and the job storage conditions in the spools 225 and 243.

In the print server 102 including the print execution section 221 having the CPU 11, the ROM 12, and the RAM 13 and the print server 103 including the print execution section 242 having the CPU 11, the ROM 12, and the RAM 13, each CPU 11 fetches the printing job from each of the spools 225 and 243 on the basis of a program stored in each of the ROMs 12, which printing jobs are transmitted for printing to the printers 105 and 106 corresponding to the spools (corresponding to the disk unit 17) 225 and 243.

The spool 225 of the print server 102 stores therein the printing job 226a. The printing job 226a includes a control file and a data file, for example. The control file is a file for describing general information of the printing job 226a and includes the description of the names of the user and the computer that have requested the printing operation and the data file name. The data file is a file for indicating printing contents described in ESC/P, LISP, PostScript (a page description language for describing text, figures, or images in page units).

In the continued print processing section 223 including the CPU 11, the ROM 12, and the RAM 13, the CPU 11 receives the communication message (including the names of the printing job, the printer first requested for printing, the alternate printer, and the user) transmitted from the client 111 according to a program stored in the ROM 12 via the communication I/F section 222, which information is stored in the RAM 13 or the like. In the user name identifier section 224 of the continued print processing section 223, the CPU 11 compares the name of the user (including the system manager) of the communication message received and stored in the RAM 13 or the like with the user name fetched from the control file of the printing job 226a. When the two user names are coincident with each other or the user name fetched from the communication message is that of the system manager, the CPU 11 transfers the printing job 226a stored in the spool 225 to the spool 243 of another print server 103. On the other hand, in the case where the user names are not coincident, indicating that the name of the user at the client 111 who has input the continued print command is different from the user name of the printing job 226a stored in the spool 225, the CPU 11 transmits an error message indicating that the printing cannot be continued using another printer to the client 111 through the LAN 100 via the communication I/F section 222.

In FIG. 4, the print server 102 and the print server 103 have the same function, and therefore the continued print processing section is not shown in the print server 103.

The spool is a waiting queue corresponding to each printer and stores printing jobs. The printing job requested to be printed on the printer 105 is stored in the spool 225, and the printing job requested to be printed on the printer 106 is stored in the spool 243.

Figure 5:
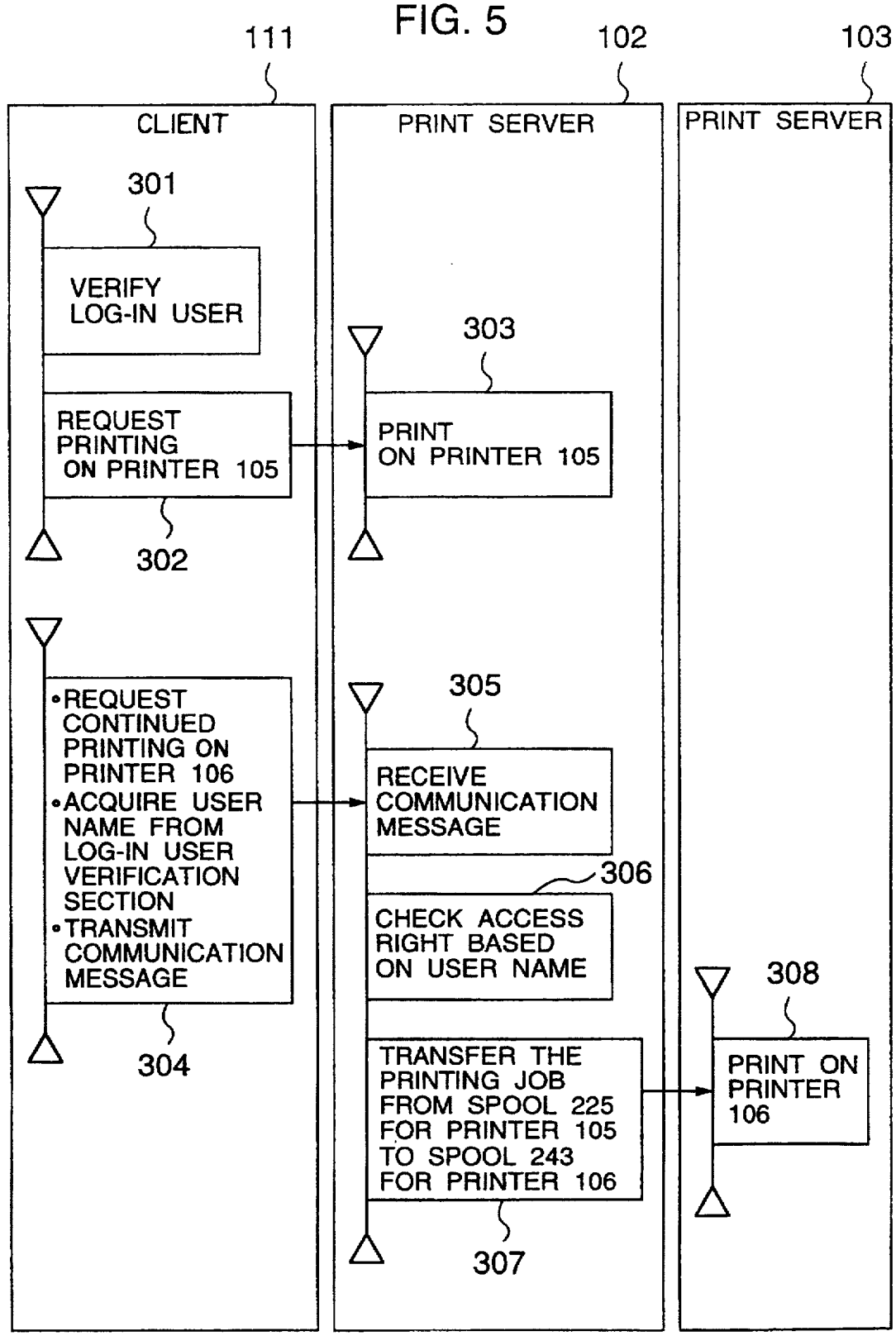
FIG. 5 is a diagram showing the operating procedure according to the first embodiment shown in FIG. 4.

FIG. 5 is a diagram showing the operating procedure for the first embodiment.

In step 301, the log-in user verification section 201 verifies the user based on the user name and the password input by the user when logging in to the client 111.

In step 302, the client 111 requests the printing job 226a to be printed on the printer 105. The client 111 stores the printing job 226a in the spool 225 of the print server 102 via the communication I/F section 203.

In step 303, the print execution section 221 in the print server 102 fetches the printing jobs sequentially from the spool 225 and transmits them to the printer 105 for printing.

In step 304, the user inputs a continued print command to the client 111 requesting that the printing job 226a originally requested to be printed on the printer 105 now be printed on the printer 106. The user name acquisition section 205 in the continued print request section 204 in the client 111 acquires the user name from the log-in user verification section 201. The continued print request section 204 generates the above-mentioned communication message (composed of the names of the printing job, the printer 105 first requested for printing, the alternate printer 106, and the user), and transmits it to the print server 103 via the communication I/F section 203.

In step 305, the continued print processing section 223 in the print server 102 receives the communication message via the communication I/F section 222.

In step 306, the user name identifier section 224 in the continued print processing section 223 compares the user name fetched from the control file of the printing job 226a stored in the spool 225 with the user name fetched from the communication message. In the case where the two user names are coincident with each other or the name of the user fetched from the communication message is that of the system manager, step 307 is then performed in which the continued print processing section 223 transfers the printing job 226a from the spool 225 to the print server 103 having the spool 243 for the printer 106. In the case where the two user names fail to coincide with each other in step 306, the name of the user issuing the continued print command is different from the user name for the printing job, and therefore an error message indicating that the printing cannot be continued using another printer is transmitted to the client 111, thus terminating the process.

In step 308, the print execution section 242 in the print server 103 fetches the printing job 226a from the spool 243 and transmits it to the printer 106 for printing.

As explained above, according to the first embodiment, a user name acquisition section is included in the continued print request section of the client and a user name identifier section is included in the continued print processing section of the print server, whereby only the system manager or the original user who has issued or input a continued print command can continue to print using an alternate printer, thereby improving the reliability of the printing system. In other words, when the printing operation is continued using another printer, the user is verified for the particular printing job, and therefore someone other than the system manager or the original user who has issued or input the continued print command cannot perform the printing operation.

Now, a second embodiment of the invention will be described with reference to FIGS. 6 and 7.

Figure 6:
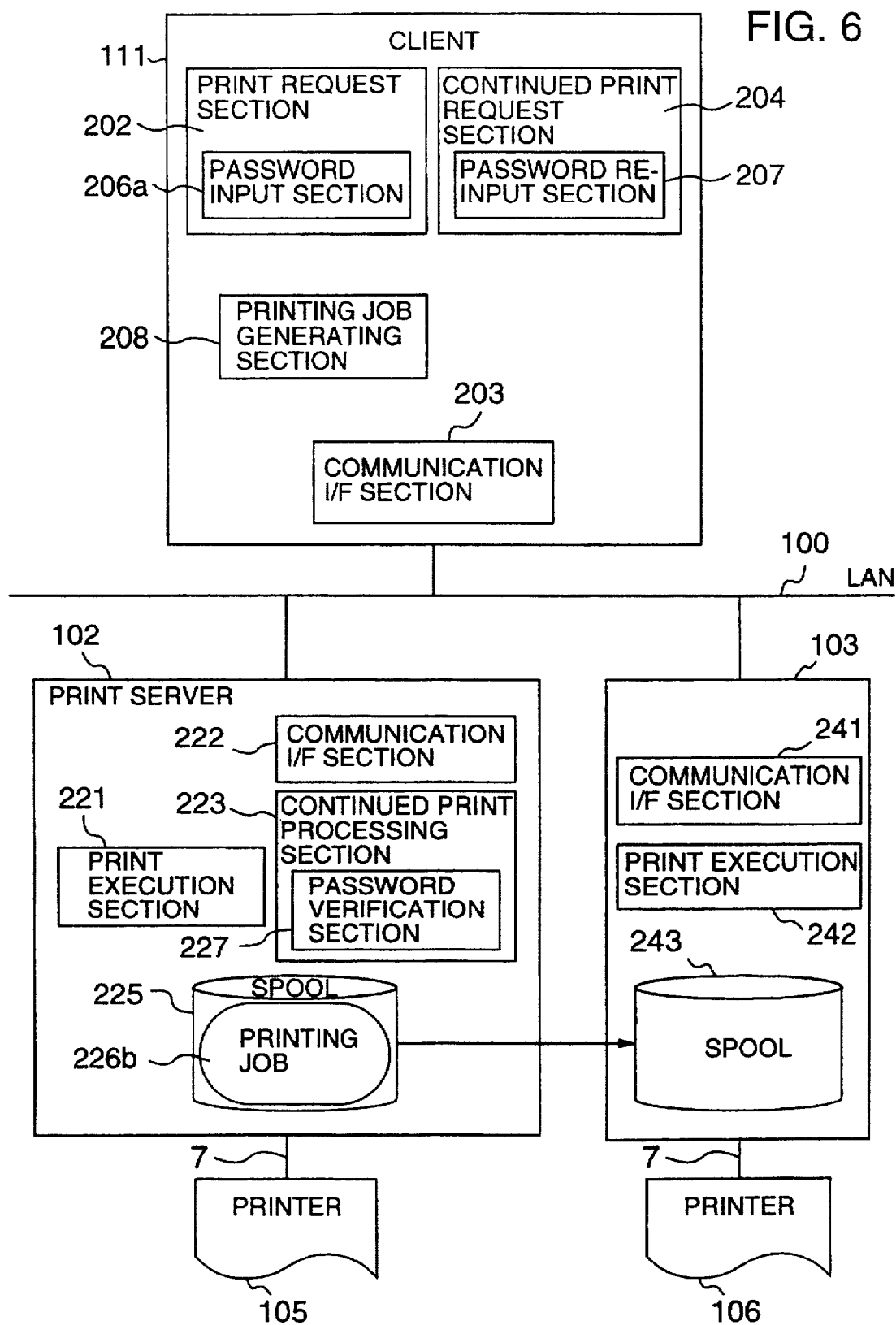
FIG. 6 is a diagram showing the functional configuration of a printing system according to a second embodiment of the invention.

FIG. 6 is a diagram showing the functional configuration of the second embodiment. Basically, this embodiment is the same in functional configuration as the embodiment shown in FIG. 4, with the exception that the following functions and processes are added.

A password file (not shown) for entering a password is added as a constituent element of the printing job 226b stored in the spool 225. Alternatively, a password is added to the control file constituting a constituent element of the printing job 226b in order to enter the password.

When a printing request is issued by the user using the print request section 202 in the client 111, a password is input in a password input section 206a using the input devices 14, 15 and entered in the password file making up a constituent element of the printing job 226b stored in the spool 225. The password input section 206a is included in the print request section 202 of the client 111. More specifically, the print request section 202 of the client 111 includes input devices such as a keyboard 14 and a mouse 15, a CPU 11, a ROM 12, a RAM 13, a disk unit (external memory) 17, and a display 19. The user inputs a password by way of the password input section (including the input devices 14 and 15) 206a, and further requests the printing of the desired printing job on the printer 105 by inputting a print request command.

The CPU 11 selects a file (which includes a control file and a data file, for example) 226b for the requested printing job from among those printing jobs generated by a printing job generating section 208 in accordance with a program stored in the ROM 12, inserts the password into the password file or the control file of the particular printing job 226b, and stores the printing job 226b in the spool 225 (corresponding to the disk unit (external memory) 17 shown in FIG. 2) of the print server 102 through the LAN 100 via the communication I/F section 203. The printing job file 226b stored in the spool 225 has the password file or the control file constituting a constituent element of the printing job which has entered therein the password that the user has used in requesting the printing operation.

According to the second embodiment, the user name in the communication message in the first embodiment is changed to a password. The password, which is normally composed of eight or less alphanumeric characters and symbols combined, may follow other specifications.

A password re-input section 207 is provided in the continued print request section 204 of the client 111 for inputting a password again when the user requests a continued printing operation using the continued print request section 204. More specifically, the user enters a continued print command (including the names of the printing job, the printer 105 first requested for printing, and the alternate printer 106) by way of the input devices 14 and 15 and a password by way of the password re-input section (including the input devices 14 and 15) 207. The continued print request section 204 of the client 111 then causes the CPU 11 to generate a communication message (including the names of the printing job, the printer first requested for printing, and the alternate printer, and the password) comprised of the continued print command input by the user through the input devices 14 and 15 and the password input through the password re-input section 207 according to a program stored in the ROM 12, which communication message is transmitted to the print server 102 through the LAN 100 via the communication I/F section 203. The contents of the communication message generated at the continued print request section 204 are the names of a printing job, the printer 105 first requested for printing, and the alternate printer 106, and the password (input by way of the password re-input section 207).

Further, the continued print processing section 223 of the print server 102 includes therein a password verification section 227. In the password verification section 227 of the continued print processing section 223, the CPU 11 compares the password transmitted in the communication message (including the names of the printing job, the printer first requested for printing, and the alternate printer, and the password) with the password entered in the password file of the printing job 226b stored in the spool 225. In the case where both passwords coincide with each other, the CPU 11 of the password verification section 227 transfers the printing job 226b stored in the spool 225 to the spool 243 of another print server 103. In the case where both passwords do not coincide with each other, the password input together with the print request command supplied from the user at the client 111 is different from the password re-input together with the continued print command, and therefore the CPU 11 transmits an error message indicating that the continued printing operation using another printer is impossible to the client 111 through the LAN 100 via the communication I/F section 222.

In FIG. 6, the print server 102 and the print server 103 have the same function, and therefore the print server 103 is shown without the continued print processing section.

Figure 7:
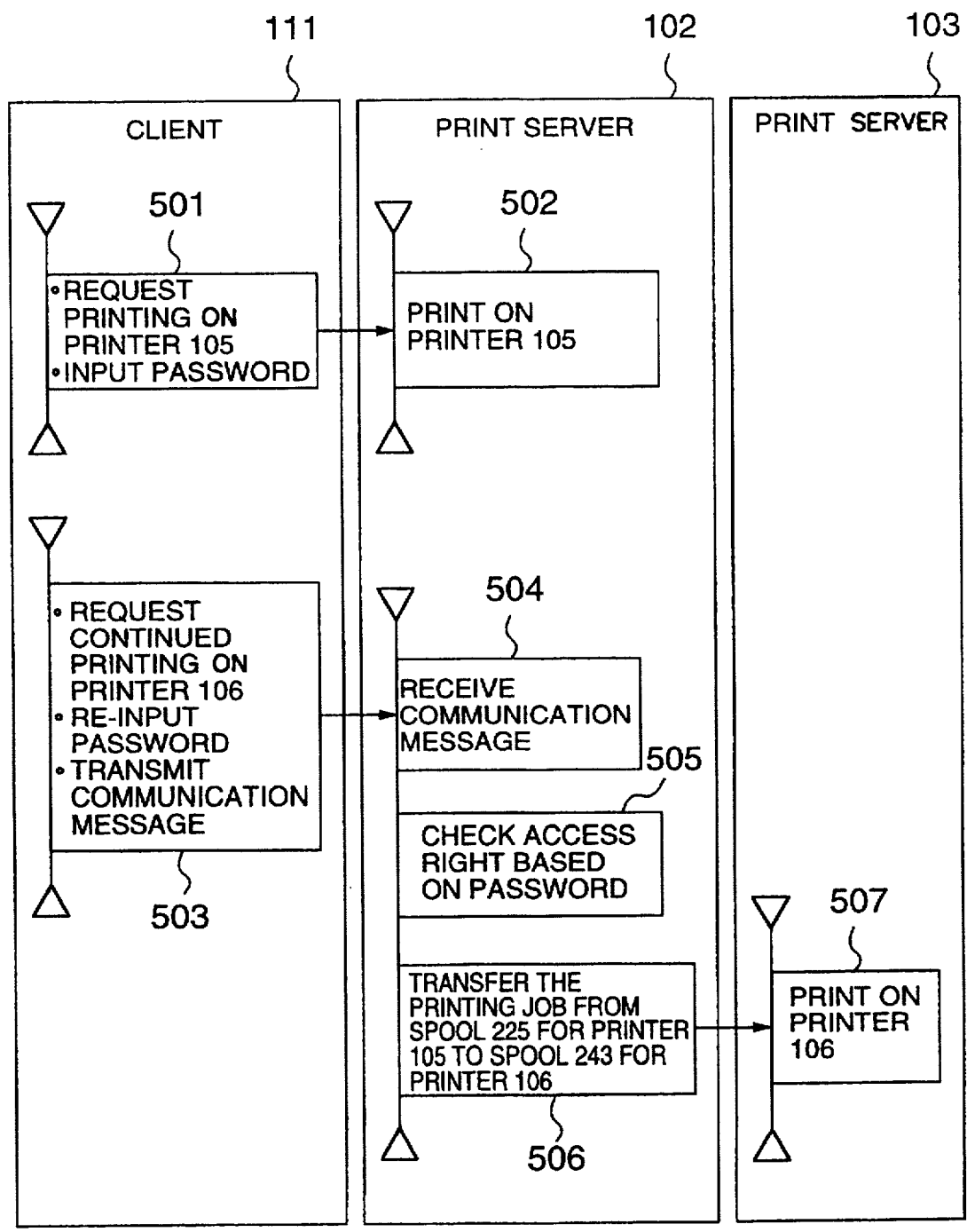
FIG. 7 is a diagram showing the operating procedure according to the second embodiment shown in FIG. 6.

FIG. 7 is a diagram showing the operating procedure according to the second embodiment.

In step 501, a user of the client 111 requests a printing operation on the printer 105, and inputs a password using a password input section 206a. The client 111 stores the printing job 226b in the spool 225 of the print server 102 via the communication I/F section 203.

In step 502, the print execution section 221 in the print server 102 fetches the printing jobs sequentially from the spool 225 and transmits them to the printer 105 for printing.

In step 503, the user issues or inputs a continued print command to the continued print request section 204 of the client 111 requesting that the printing job 226b originally requested to be printed on the printer 105 now be printed on the printer 106, while at the same time re-inputting the password by way of the password re-input section 207. The continued print request section 204 generates a communication message (including the names of the printing job, the printer 105 first requested for printing, and the alternate printer 106, and the password) and transmits it to the print server 102 via the communication I/F section 203. The contents of the communication message are the names of the printing job, the printer 105 first requested for printing, and the alternate printer 106, and the password.

In step 504, the continued print processing section 223 in the print server 102 receives the communication message via the communication I/F section 222.

In step 505, the password verification section 227 of the continued print processing section 223 compares the password fetched from the password file of the printing job 226b stored in the spool 225 with the password retrieved from the communication message received by the continued print processing section 223. When the two passwords coincide with each other, step 506 in then performed in which the continued print processing section 223 transfers the printing job 226b from the spool 225 to the print server 103 having the spool 243 for the printer 106. In the case where the two passwords fail to coincide with each other in step 505 and therefore the password input together with the print request command is different from the password re-input together with the continued print command, an error message indicating that the continued printing using another printer is impossible is transmitted to the client 111, thereby terminating the process.

In step 507, the print execution section 242 in the print server 103 retrieves the printing job 226b from the spool 243 and transmits it to the printer 106 for printing.

Also, the system manager can be authorized to continue the printing operation by entering the password for the system manager in the print server 102.

As explained above, according to the second embodiment, a password input section is provided in the print request section of the client, a password re-input section is provided in the continued print request section of the client, and a password verification section is provided in the continued print processing section of the print server in order for a password to be entered with respect to a printing job. As a result, only the original user or the system manager who has issued or input a continued print command can continue the printing operation using an alternate printer, thereby improving the reliability of the printing system. In other words, when continuing the printing operation using another printer, the user is verified by entering a password for the particular printing job, so that persons other than the original user or the system manager who has issued a continued print command are prevented from continuing the printing operation.

Now, a third embodiment of the invention will be described with reference to FIGS. 8 to 10.

Figure 8:
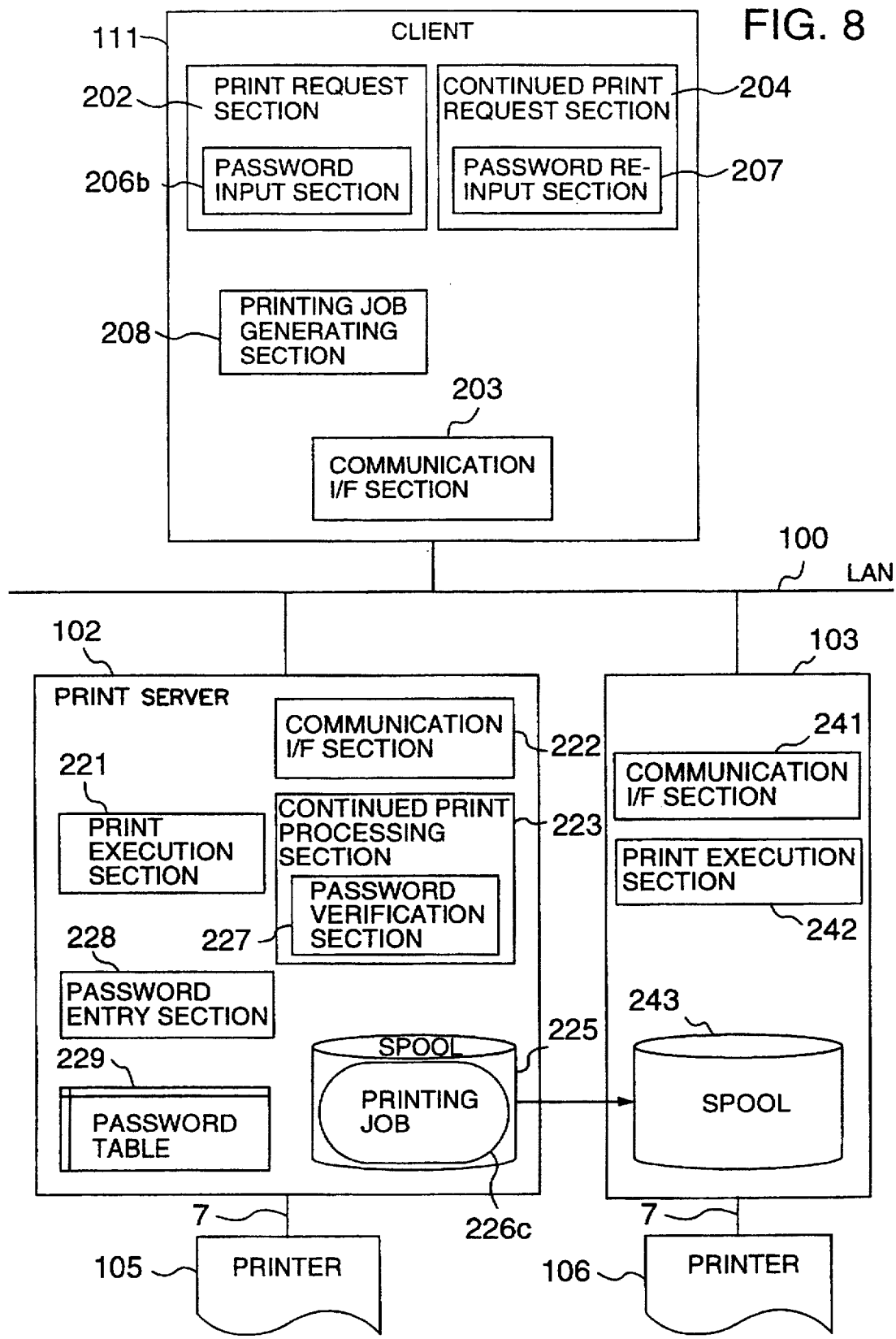
FIG. 8 is a diagram showing the functional configuration of a printing system according to a third embodiment of the invention.

FIG. 8 is a diagram showing the functional configuration of the third embodiment. This configuration, which is basically the same as that shown in FIG. 4, has added thereto the following functions and processes.

The print server 102 includes a password table 229 for describing passwords and names of printing jobs. A password entry section 228 is further added for entering and deleting a password and the name of a printing job.

When a print request is made by the user through a print request section 202 of a client 111, a password is input using input devices 14 and 15. The password thus input is transmitted to the print server 102 through a LAN 100 via a communication I/F section 203 by means of a password input section 206b which is included in the print request section 202 of the client 111. More specifically, the print request section 202 of the client 111 includes input devices such as a keyboard 14 and a mouse 15, a CPU 11, a ROM 12, a RAM 13, a disk unit (external memory) 17, and a display 19. Upon request of the user for performing the desired printing job on the printer 105 by inputting a print request command, the CPU 11 selects a file 226c (which includes a control file and a data file, for example) of the printing job requested from among those generated by a printing job generating section 208 according to a program stored in the ROM 12. The file 226c is stored in the spool 225 (the disk unit (external memory) 17 shown in FIG. 2) of the print server 102 through the LAN 100 via the communication I/F section 203. Further, the password input by way of the password input section 206b and the file name of the printing job requested to be printed (the name of the printing job) are transmitted via the communication I/F section 203 through the LAN 100 to the password entry section (including the CPU 11 and the like shown in FIG. 2) 228 of the print server 102 and entered in the password table (including the RAM 13 or the disk unit 17 shown in FIG. 2) 229 by means of the password entry section 228.

According to the third embodiment, the user name in the communication message in the first embodiment is changed to a password. The password is composed of eight or less alphanumeric characters or symbols in an appropriate combination. In spite of this, other types of password specifications may be followed.

A password re-input section 207 is included in the continued print request section 204 of the client 111 for inputting a password again when the user requests a continued printing operation using the continued print request section 204 of the client 111. More specifically, when the user inputs a continued print command (including the names of the printing job, the printer first requested for printing, and the alternate printer) through the input devices 14 and 15 and a password through the password re-input section (including the input devices 14 and 15) 207, the continued print request section 204 of the client 111 has the CPU 11 thereof generate a communication message (including the names of the printing job, the printer first requested for printing, and the alternate printer, and the password) including the continued print command input by the user through the input devices 14 and 15 and the password input through the password re-input section 207 according to a program stored in the ROM 12, which communication message is transmitted from the communication I/F section 203 through the LAN 100 to the print server 102.

Further, the continued print processing section 223 of the print server 102 includes therein a password verification section 227. In the password verification section 227 of the continued print processing section 223, the CPU 11 compares the password transmitted in the communication message (including the names of the printing job, the printer first requested for printing, and the alternate printer, and the password) with the password entered in the password table 229. In the case where the two passwords coincide with each other, the CPU 11 of the password verification section 227 transfers the printing job 226c from the spool 225 to the spool 243 of the print server 103 connected to the printer 106, while at the same time deleting the password and the name of the printing job from the password table 229. Also, in the case where the password input together with the print request command supplied by the user at the client 111 is different from the password re-input together with the continued print command, the CPU 11 of the password verification section 227 transmits an error message indicating that the continued printing operation using another printer is impossible to the client 111 from the communication I/F section 222 through the LAN 100.

FIG. 9 is a diagram showing the configuration of the password table 229 in the print server 102. The password table 229 contains a list of a plurality of printing job names 702 and corresponding passwords 701. In the case where the name of a printing job is "REPORT.txt", for example, the corresponding password is "xy12rt".

Figure 10:
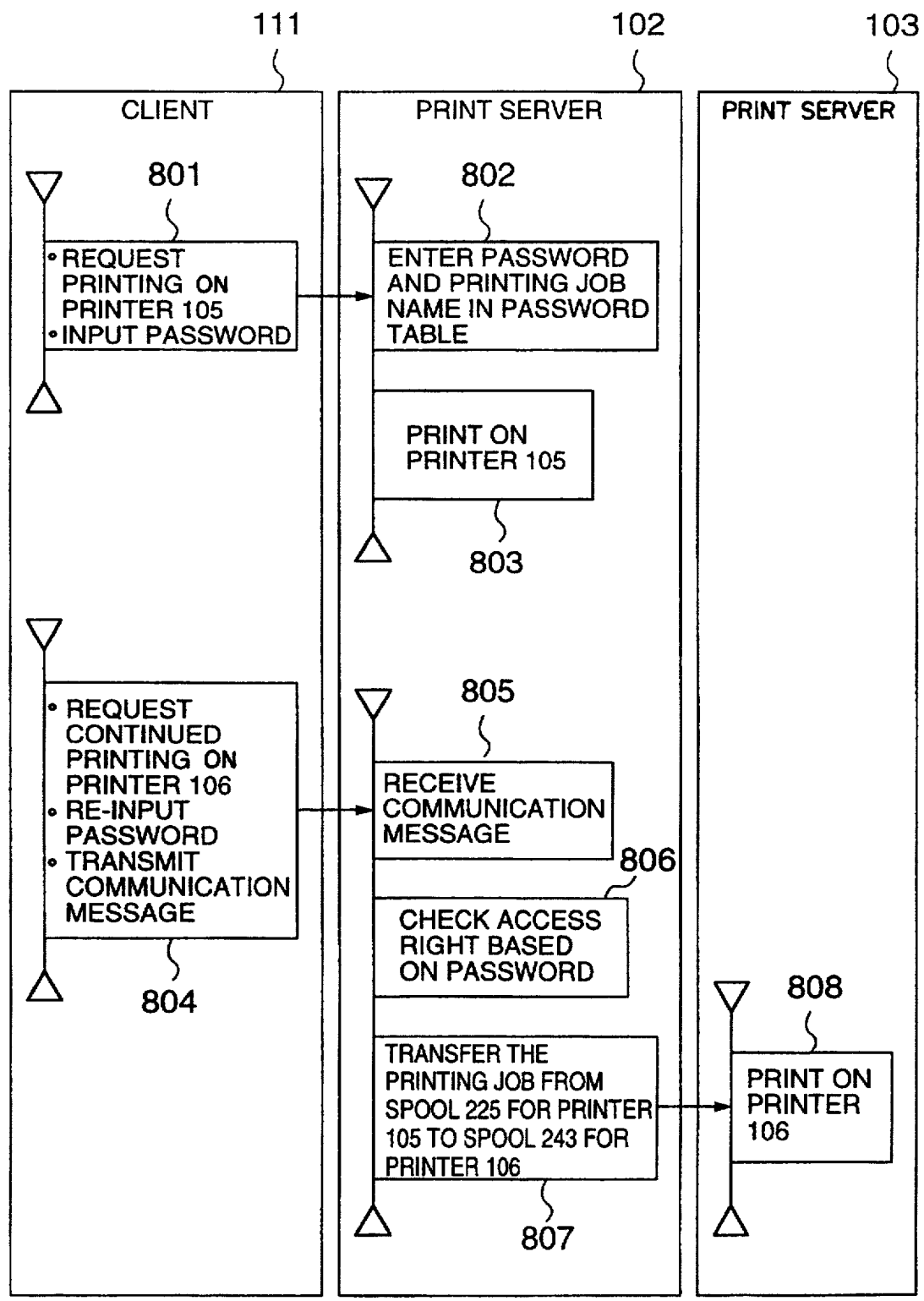
FIG. 10 is a diagram showing the operating procedure according to the third embodiment shown in FIG. 8.

FIG. 10 is a diagram showing the operating procedure according to the third embodiment of the invention.

In step 801, a user of the client 111 requests a printing operation to be performed on the printer 105, and inputs a password by way of the password input section 206b. The client 111 transmits the password to the print server 102 from the communication I/F section 203, and stores a printing job 226c in the spool 225 of the print server 102.

In step 802, the password entry section 228 in the print server 102 enters the password thus received together with the name of the printing job in the password table 229.

In step 803, the print execution section 221 in the print server 102 retrieves the printing jobs sequentially from the spool 225 and transmits them to the printer 105 for printing.

Step 804 issues or inputs a continued print command on the printer 106 to the continued print request section 204 of the client 111 with respect to the printing job 226 requested for printing to the printer 105, while at the same time re-inputting the password using the password re-input section 207. The continued print request section 204 generates a communication message and transmits it to the print server 102 through the communication I/F section 203. The contents of the communication message are the names of the printing job, the printer first requested for printing, and the alternate printer, and the password.

In step 805, the continued print processing section 223 in the print server 102 receives the communication message via the communication I/F section 222.

In step 806, the password verification section 227 of the continued print processing section 223 compares the password entered in the password table 229 with the password retrieved from the communication message. In the case where the two passwords are coincident with each other, step 807 is then performed in which the continued print processing section 223 transfers the printing job 226c to the print server 103 holding the spool 243 for the printer 106. In step 806, when the password input together with the print request command fails to coincide with the password re-input together with the continued print command, the continued print processing section 223 transmits to the client 111 an error message indicating that the continued printing operation using another printer is impossible, thereby terminating the process.

In step 808, the print execution section 242 in the print server 103 retrieves the printing job from the spool 243 and transmits it to the printer 106 for printing.

Also, the system manager can be authorized to continue the printing operation by entering the password for the system manager in the print server 102.

As described above, according to the third embodiment, in the case where the printing operation is continued using another printer, those persons other than the user who has issued a printing command or the system manager are prevented from performing the printing operation by entering a password for the particular printing job and thus verifying the user with respect to the particular printing job. For this purpose, the print request section of the client includes a password input section, and the continued print request section includes a password re-input section, the print server includes a password entry section and a password table, and the continued print processing section includes a password verification section, whereby as in the first and second embodiments, only the user or the system manager who has issued a continued print command can continue the printing operation using an alternate printer, thereby improving the reliability of the printing system.

Modifications of the aforementioned embodiments are described below.

(1) According to a modification, the access right of the user to a printing job is restricted. This restriction of access rights is applicable, however, not only to printing jobs but also to printing resources such as the printer, the print server, the paper cassette mounted on the printer, the type of paper (including the size and the material of the paper such as common paper, overhead projector sheets, or tracing paper), the paper supply position, the paper delivery tray, the font, and the paper format. As a result, the users capable of freely using the printing resources can be limited for an improved overall reliability of the printing system.

(2) In the above-mentioned embodiments, the printer X and the printer Y are controlled by different print servers. The printing system according to the invention, however, can be applied also to the case where a single print server controls both the printers X and Y (the printing jobs performed by the printers X and Y are stored in the spools of the respective print servers).

(3) According to the above-mentioned embodiments the functions of the print server and the client are incorporated in different computers. The printing system according to the invention, however, is also applicable to the case in which a single computer has the functions of both the print server and the client.

(4) Although the printers X and Y are directly connected to the server according to the above-mentioned embodiments, the printing system according to the invention is also applicable, however, to the case in which the printers X and Y are network printers (the printing jobs printed by the respective network printers X and Y are stored in the corresponding spools of the print servers connected to the network).

(5) According to a still further modification, apart from the user verification with respect to a continued print command on an alternate printer as a command to control the printing operation, the printing system according to the invention is applicable with equal effect to the user verification with respect to print control commands for the continued printing, the deletion of a printing job, the enquiry for a printing job, the interruption and resumption of a printing job and the spool control using a single printer. These print control commands are described in detail in the co-pending patent application Ser. No. 08/361,226.

According to this invention, the user is verified or a password is entered with respect to a printing job stored in a spool at the time of continuing the printing job, so that only the user or the system manager who has requested the execution of a printing job can continue the printing job using an alternate printer. As a result, other users cannot continue executing a printing job freely, thereby leading to the advantage of an improved reliability of the printing system.

We claim:

1. A printing system having a plurality of printers and a plurality of computers connected to each other through a communication network, comprising:

a first computer including
means for generating a printing job and a print request signal for executing the printing job according to a print request designated by a user to a first printer,
means for generating a continued print request signal containing information unique to the user according to a continued print request issued by the user to a second printer to execute the printing job, and
communication means for transmitting said printing job and each of said print request signal and said continued print request signal to said communication network; and a second computer including
means for receiving said printing job and each of said print request signal and said continued print request signal through said communication network, means for causing said first printer to execute the printing job designated by the user according to said print request signal,
means for deciding that the information unique to the user belongs to the user who designated said printing job upon receipt of said continued print request signal containing said information unique to the user, and
means for causing said second printer to execute said printing job according to said continued print request signal in the case where said continued print request signal containing said information unique to the user are determined to belong to said user;
wherein said first computer further includes means for entering a password as information unique to said user, said password being entered in said means for entering when the print request and the continued print request are designated by the user, said communication means transmitting a selected one of said print request signal and said continued print request signal to said communication network together with said password entered; and
wherein said second computer further includes file means for storing said password received together with said print request signal, said means for deciding causing said printing job to be executed on said second printer in the case where the password stored in said file means is coincident with the password received together with said continued print request signal.

2. A printing system according to claim 1, wherein said second computer further includes memory means for storing said printing job transmitted thereto; and wherein said file means is provided in said memory means.

3. A printing system according to claim 1, wherein said second computer further includes memory means for storing said printing job transmitted thereto; and wherein said file means is a password table indicating said password and the name of a printing job corresponding to said password.

* * * * *